| (12) | United States Patent | (10) Patent No.: | US 10,589,801 B2 |
|---|---|---|---|
| | Smith | (45) Date of Patent: | Mar. 17, 2020 |

(54) VEHICLE PROPULSIVE AERODYNAMIC ELEMENTS

(71) Applicant: PACCAR Inc, Bellevue, WA (US)

(72) Inventor: Jeffrey P. Smith, Prosper, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 15/965,327

(22) Filed: Apr. 27, 2018

(65) Prior Publication Data

US 2018/0312203 A1 Nov. 1, 2018

Related U.S. Application Data

(60) Provisional application No. 62/642,882, filed on Mar. 14, 2018, provisional application No. 62/490,991, filed on Apr. 27, 2017.

(51) Int. Cl.
 *B62D 35/00* (2006.01)
 *B62D 37/02* (2006.01)
 *B62D 63/08* (2006.01)

(52) U.S. Cl.
 CPC .......... *B62D 35/001* (2013.01); *B62D 35/008* (2013.01); *B62D 37/02* (2013.01); *B62D 63/08* (2013.01)

(58) Field of Classification Search
 CPC .. B62D 35/001; B62D 35/002; B62D 35/008; B62D 37/02
 USPC ............................. 296/180.1, 180.4, 180.5
 See application file for complete search history.

(56) References Cited

U.S. PATENT DOCUMENTS

| 5,275,249 | A | 1/1994 | Nelson |
| 5,374,098 | A | 12/1994 | Nelson |
| 5,454,619 | A | 10/1995 | Haraway |
| 6,196,620 | B1 | 3/2001 | Haraway, Jr. |
| 6,412,853 | B1 * | 7/2002 | Richardson ............ B62D 35/00 296/180.1 |
| 7,255,387 | B2 | 8/2007 | Wood |
| 8,083,284 | B1 | 12/2011 | Logounov |
| 8,100,461 | B2 | 1/2012 | Smith et al. |
| 8,177,287 | B2 | 5/2012 | Vogel et al. |

(Continued)

FOREIGN PATENT DOCUMENTS

| WO | 2012/138082 A2 | 10/2012 |
| WO | 2015/007942 A1 | 1/2015 |

(Continued)

*Primary Examiner* — Gregory A Blankenship
(74) *Attorney, Agent, or Firm* — Seed Intellectual Property Law Group LLP

(57) ABSTRACT

Drag reducing systems for vehicles are provided. In one aspect, a drag reducing system generally includes an airfoil rotatably couplable to the vehicle and configured to provide a lift force to the vehicle as a result of differential airflow velocity over the upper surface with respect to the lower surface. The drag reducing system may further include a flow alignment vane to rotationally align the airfoil to the direction of airflow. In another aspect, a drag reducing system generally includes an air vane hingedly couplable to a surface of a vehicle and configured to rotate from a first stowed position to second deployed position. The air vane includes a flared leading portion to provide a force to bias the air vane toward the first position and a flared lateral portion to provide a force to rotate the air vane to the second deployed position.

8 Claims, 9 Drawing Sheets

(56) References Cited

U.S. PATENT DOCUMENTS

| | | |
|---|---|---|
| 8,226,152 B2 | 7/2012 | Calco |
| 8,403,400 B2 | 3/2013 | Brewer |
| 8,770,650 B1 | 7/2014 | Brosseau |
| 8,851,554 B2 | 10/2014 | Wayburn et al. |
| 9,340,240 B2 | 5/2016 | Clark |
| 9,440,688 B2 | 9/2016 | Smith et al. |
| 10,227,095 B2* | 3/2019 | Gaylard .............. B62D 35/008 |
| 2005/0040669 A1* | 2/2005 | Wood .................. B62D 35/001 |
| | | 296/180.1 |
| 2010/0106380 A1 | 4/2010 | Salari et al. |
| 2010/0194143 A1 | 8/2010 | Perkins et al. |
| 2010/0194144 A1 | 8/2010 | Sinha |
| 2011/0148143 A1* | 6/2011 | Ondracek ........... B62D 35/008 |
| | | 296/180.5 |
| 2012/0126572 A1 | 5/2012 | Hjelm et al. |
| 2014/0167447 A1* | 6/2014 | Meredith ............ B62D 35/001 |
| | | 296/180.4 |
| 2014/0252799 A1* | 9/2014 | Smith ................. B62D 35/001 |
| | | 296/180.4 |
| 2015/0035312 A1 | 2/2015 | Grandominico et al. |
| 2016/0185400 A1 | 6/2016 | Martinus et al. |
| 2016/0236726 A1 | 8/2016 | Baker et al. |
| 2016/0244108 A1 | 8/2016 | Tsuruta et al. |
| 2016/0332680 A1* | 11/2016 | Dieckmann ......... B62D 35/007 |
| 2018/0312203 A1* | 11/2018 | Smith ................. B62D 35/001 |
| 2019/0092144 A1* | 3/2019 | Cunningham ............ B60J 1/20 |
| 2019/0256157 A1* | 8/2019 | Hinterbuchinger .... B62D 37/02 |
| 2019/0276097 A1* | 9/2019 | Howard ................... B60R 1/07 |

FOREIGN PATENT DOCUMENTS

| | | |
|---|---|---|
| WO | 2015/191472 A1 | 12/2015 |
| WO | 2016/032421 A1 | 3/2016 |

\* cited by examiner

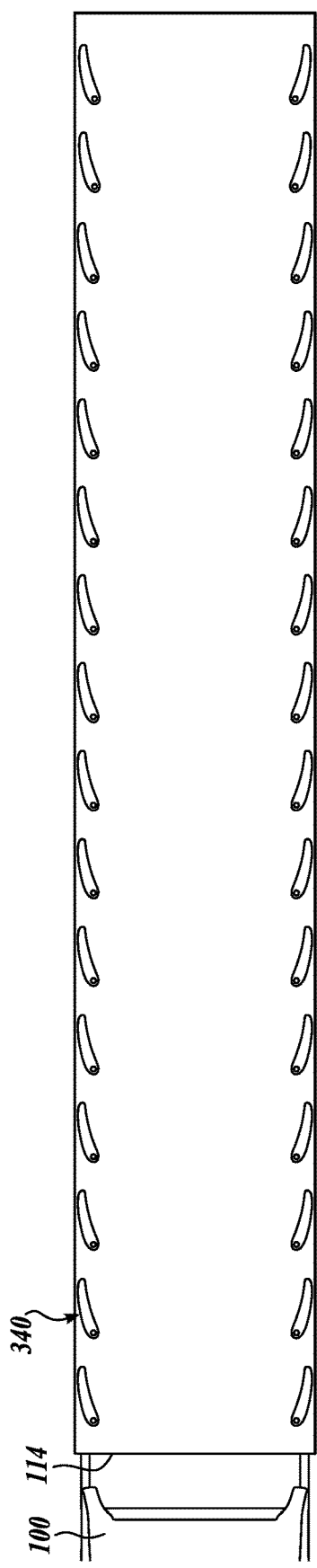
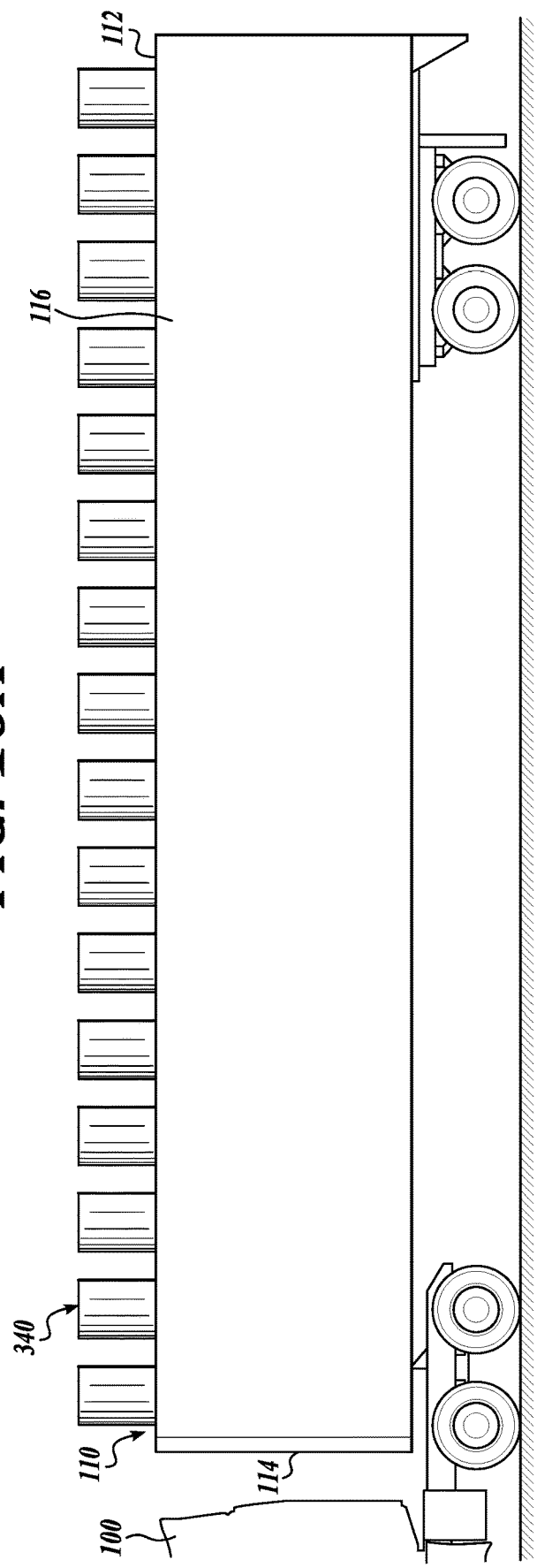

VEHICLE PROPULSIVE AERODYNAMIC ELEMENTS

CROSS-REFERENCES TO RELATED APPLICATIONS

This application claims the benefit of U.S. Provisional Patent Application Nos. 62/490,991, filed Apr. 27, 2017, and 62/642,882, filed Mar. 14, 2018, the disclosures of which are hereby expressly incorporated by reference herein in their entirety.

BACKGROUND

Numerous means have been sought to improve the fuel-efficiency of moving bodies and, especially, moving bluff bodies by reducing their aerodynamic drag. In the field of surface transportation, and particularly in the long-haul trucking industry, even small improvements in fuel efficiency can reduce annual operating costs significantly. It is therefore advantageous in the design of a vehicle to reduce drag forces, thereby increasing the aerodynamic properties and efficiency of the vehicle.

The over-the-highway cargo-hauling tractor-trailer combination is one vehicle that experiences excessive aerodynamic drag. Generally described, tractor-trailer combinations typically include a tractor having a so-called fifth wheel by which a box-like semi-trailer may be attached to the tractor by an articulated connection for transportation of the cargo trailer.

It is well known that bluff bodies, such as trailers, contribute significantly to aerodynamic drag, as evidenced by the formation of a wake along the length of and in the trailing region behind the trailer. The generation of the wake, formed by eddies, can be contributed to the shape of the conventional trailer, which is essentially a rectangular box having a flat, rectangular roof along with flat, rectangular side panels. The fore and aft vertical surfaces of such trailers are also generally flat rectangular surfaces. As such, current bluff bodies, such as the conventional trailer, which are generally suitable for use with tractors of Class 8 and other types, suffer from a low pressure zone at the rear of the trailer such that the air stream suffers from early separation, resulting in a broad eddying wake forming downstream of the separation. Trailers in motion also experience aerodynamic drag resulting from crosswind yaw conditions. Crosswinds result in vertical airflow up the sides of the trailers. The airflow separates from the top of the trailer, forming a strong cone vortex that increases drag and reduces vehicle efficiency. The net result is the creation of considerable aerodynamic drag.

SUMMARY

In accordance with one embodiment of the present disclosure, a drag reducing assembly is provided. The drag reducing assembly generally includes an airfoil rotatably couplable to a mounting surface, the airfoil having a leading edge, a trailing edge, an upper surface, and a lower surface, the airfoil configured to provide a lift force to the drag reducing assembly as a result of differential airflow velocity over the upper surface with respect to the lower surface; a flow alignment vane associated with the airfoil configured to provide a rotational alignment force to position the airfoil in a direction associated with the airflow; and a partition panel positioned between the airfoil and the flow alignment vane configured to separate the airflow over the upper and lower surfaces of the airfoil from the airflow interfacing with surfaces of the flow alignment vane, wherein the upper surface of the airfoil may have a longer distance between the leading edge and the trailing edge than the lower surface of the airfoil to generate the lift force.

In accordance with another embodiment of the present disclosure, a drag reducing system for a vehicle is provided. The drag reducing system generally includes a surface of the vehicle, a mounting pin couplable to the surface, the mounting pin defining an axis; an airfoil rotatably couplable to the mounting pin, the airfoil having a leading edge, a trailing edge, an upper surface, and a lower surface, the airfoil configured to provide a lift force to the aerodynamic assembly as a result of differential airflow velocity over the upper surface with respect to the lower surface; a flow alignment vane associated with the airfoil configured to provide a rotational alignment force to rotate the airfoil about the axis to a position directionally associated with the airflow; and a partition panel positioned between the airfoil and the flow alignment vane configured to separate the airflow over the upper and lower surfaces of the airfoil from the airflow interfacing with surfaces of the flow alignment vane.

In accordance with another embodiment of the present disclosure, a drag reducing system for a bluff body having a length and a height is provided. The drag reducing system generally includes an air vane hingedly couplable to a surface of the bluff body, the air vane having a body portion, a leading portion, a lateral portion, an upper surface, and a lower surface, the air vane configured to rotate from a first position, wherein the air vane may be positioned adjacent to the surface, to a second position, wherein the air vane may be positioned projecting at an angle away from the surface, wherein the leading portion may be flared inward toward the surface in the first position to provide a force to bias the air vane toward the first position when the airflow along the surface is aligned with the length of the bluff body, wherein the lateral portion may be flared away from the surface in the first position to provide a force to rotate the air vane from the first position toward the second position when the airflow along the surface has a directional component upward along the height of the bluff body.

In accordance with any of the embodiments disclosed herein, the drag reducing assembly may further include a mounting assembly for rotatably coupling the airfoil to the mounting surface, the mounting assembly having a base plate couplable to the mounting surface and a pin defining an axis, wherein the airfoil is configured to rotate about the axis in reaction to the rotational alignment force.

In accordance with any of the embodiments disclosed herein, the pin may include a friction reducing bearing to facilitate rotation of the airfoil in reaction to the rotational alignment force.

In accordance with any of the embodiments disclosed herein, the mounting surface may be a surface of a trailer of a tractor-trailer combination vehicle.

In accordance with any of the embodiments disclosed herein, the surface of the trailer is a lateral-facing surface, and wherein the drag reducing assembly is coupled to the lateral-facing surface such that airflow in a direction of vehicle travel passes from the leading edge of the airfoil to the trailing edge of the airfoil.

In accordance with any of the embodiments disclosed herein, the drag reducing assembly may further include a directional biasing member configured to return the airfoil to a neutral rotational position in the absence of airflow over the upper and lower surfaces.

In accordance with any of the embodiments disclosed herein, the air vane may be aligned at angle from a direction along the length of the bluff body.

In accordance with any of the embodiments disclosed herein, the angle may position the leading portion downward between about 1° and 20°.

In accordance with any of the embodiments disclosed herein, the drag reducing system may further include a biasing member couplable between the air vane and the surface, wherein the biasing member may be configured to stop the rotation of the air vane at the second position, and wherein the biasing member may be configured to bias the air vane toward the first position.

In accordance with any of the embodiments disclosed herein, the biasing member may stop the rotation of the air vane at an angle between about 60° and 90° from the surface of the bluff body.

In accordance with any of the embodiments disclosed herein, the air vane may further include a gurney strip at a trailing edge of the air vane.

In accordance with any of the embodiments disclosed herein, the flare of the leading portion may be positioned at an angle between about 3° and 10° from the body portion.

In accordance with any of the embodiments disclosed herein, the flare of the lateral portion may be positioned at an angle between about 5° and 20° from the body portion.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein:

FIG. 10A is a top view of another representative embodiment of an aerodynamic system formed in accordance with aspects of the present disclosure, showing a plurality of aerodynamic components; and FIG. 10B is a right side view of the aerodynamic system of FIG. 10A.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

Figure 1:
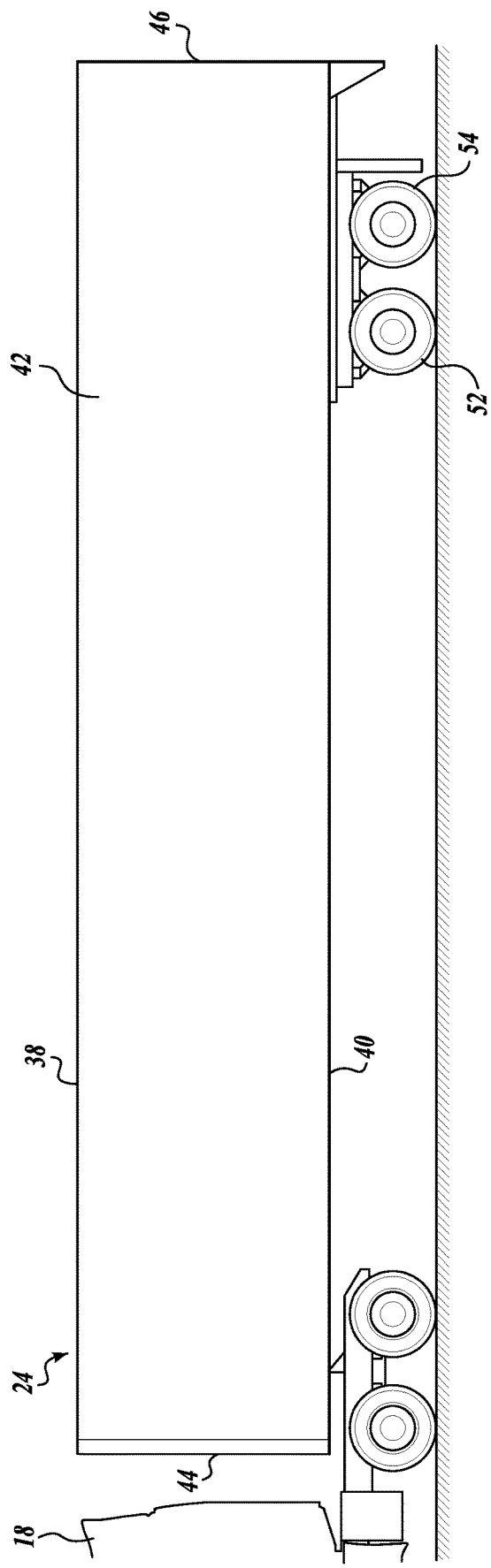
FIG. 1 is side view of a conventional cargo-type trailer.

The over-the-highway cargo hauling tractor-trailer combination is one vehicle that experiences excessive aerodynamic drag. Generally described, tractor-trailer combinations typically include a tractor 18 having a so-called fifth wheel by which a box-like semi-trailer 24 may be attached to the tractor 18 by an articulated connection for transportation of the cargo in the trailer 24, as shown in FIG. 1. The shape of the conventional cargo trailer is essentially a rectangular box having a flat, rectangular roof 38 and matching floor 40, along with flat, rectangular side panels 42. The fore and aft vertical surfaces 44 and 46, respectively, of such trailers 24 are also generally flat rectangular surfaces. The aft section of the trailer 24 is supportably mounted on one or more wheel assemblies, illustrated as components 52 and 54.

Conventional large long-haul cargo trailers similar to those described above exhibit less than optimal aerodynamic performance during highway operation. At highway speeds, these conventional trailers develop a substantial amount of turbulent airflow throughout regions of the trailer. This turbulence results in significant aerodynamic drag, increasing both fuel consumption and Nitrogen Oxide (NOx) emissions of the tractor 18.

The following discussion provides examples of systems and methods for improving the aerodynamic efficiency (e.g., reduce drag) of vehicles, such as class 8 tractor-trailer combinations. To improve the aerodynamic efficiency of the combination, examples described herein provide one or more aerodynamic components positioned on the trailer. In some examples described herein, the one or more aerodynamic components are in the form of air vanes and airfoils, which are positioned on the sides of the trailer and/or on the top of the trailer. In some embodiments, the air vanes or airfoils are positioned along the side of the trailer at locations where off-axis (e.g., at an angle to the longitudinal axis) airflow is present during forward motion of the tractor-trailer combinations. In some embodiments, the off-axis airflow has a generally upward trajectory as the airflow moves rearwardly along the trailer. In use, the one or more airfoils provide a positive or forward thrust component with respect to vehicle movement, thereby reducing the total effects of drag on the vehicle. In other uses, the one or more air vanes provide a break in the airflow to prevent the creation of a vortex on the roof of the trailer, thereby reducing the total effects of drag on the vehicle.

Although embodiments of the present disclosure will be described with reference to a cargo trailer, one skilled in the relevant art will appreciate that the disclosed embodiments are illustrative in nature, and therefore, should not be construed as limited to applications with a cargo trailer. It should therefore be apparent that the methods and systems of the present disclosure have wide application, and may be used in any situation where a reduction in the drag forces on a bluff body is desirable. In some examples, aspects of the present disclosure can be employed on the tractor of the tractor-trailer combination.

Figure 2:
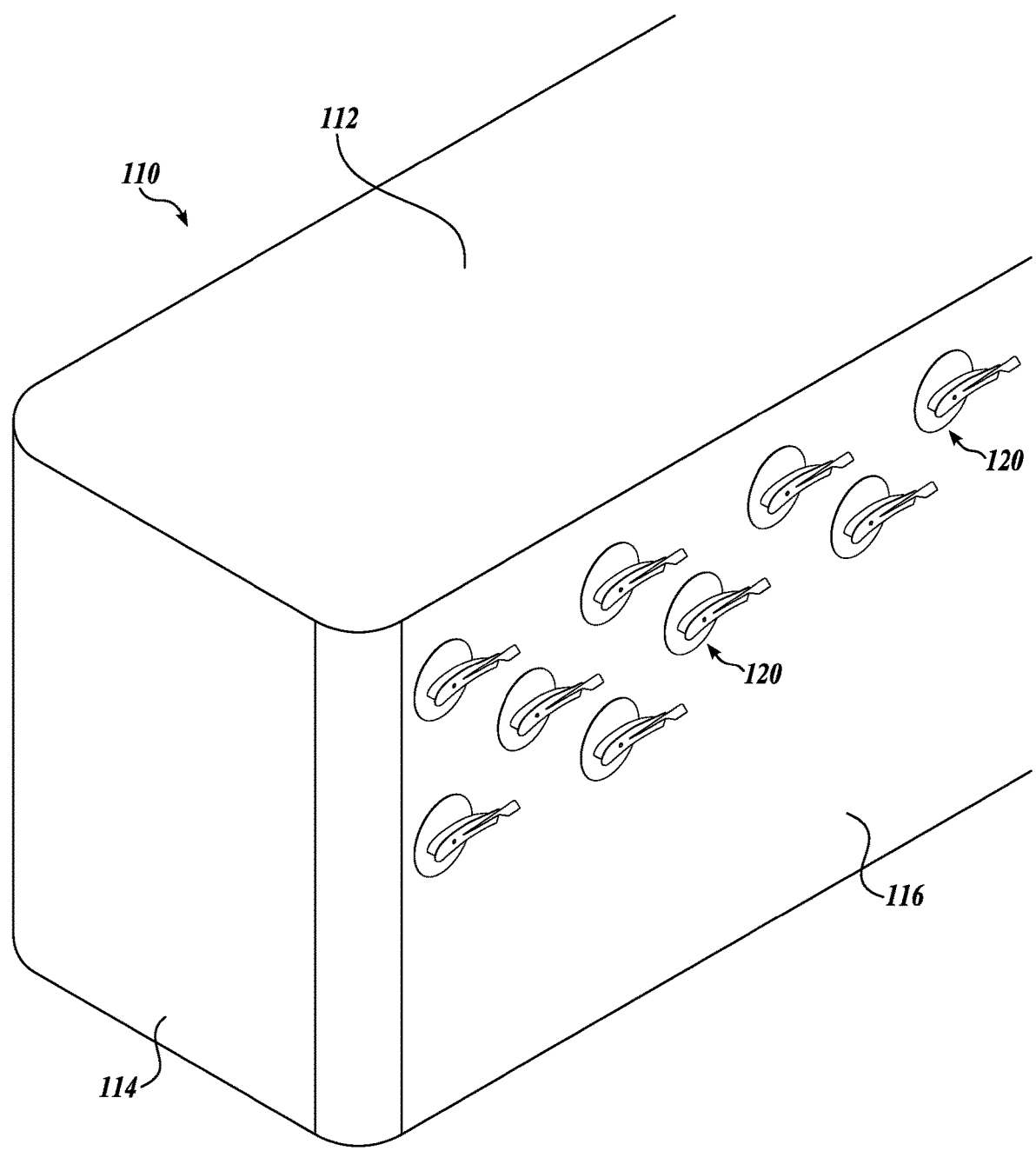
FIG. 2 is a front perspective view of one representative embodiment of a drag reducing system formed in accordance with aspects of the present disclosure.

FIG. 2 illustrates a perspective view of one example of an aerodynamic (e.g., drag reducing) system, generally denoted 110, having a plurality of drag reducing assemblies 120, or components, associated with a cargo-type trailer, according to aspects of the present disclosure. The trailer includes a body that defines a cargo carrying interior cavity (not shown). In the embodiment shown, the body is generally rectangular in shape, having a generally planar, vertically oriented front panel 114, rear end panels (not shown), generally planar, vertically oriented side panels 116, and a generally planar top panel 112.

As best shown in FIG. 2, the system 110 includes a plurality of the drag reducing assembly 120. FIG. 2 shows the right-side, (when viewing from the front of the combination rearwardly), components 120 of the system 110 mounted on the side panel 116. It should be noted that the structures and arrangements of the depicted right-side components 120 can be a mirror of right-side components. In other embodiments, any number of drag reducing assemblies 120 is suitably used with the aerodynamic system 110. It is noted that the drawings and descriptions of the right-side components 120 are equally applicable to the embodiments at both sides of cargo-type trailer; however, in some cases, portions may have mirrored geometry for right-side use, for instance, such that the lift of the drag reducing assembly 120 is oriented in the desired direction to provide the aerodynamic benefit. In further embodiments, the drag reducing assemblies 120 may be mounted in a uniform pattern or placed at random locations along the panels of the trailer 112, 114, and 116.

Figure 4:
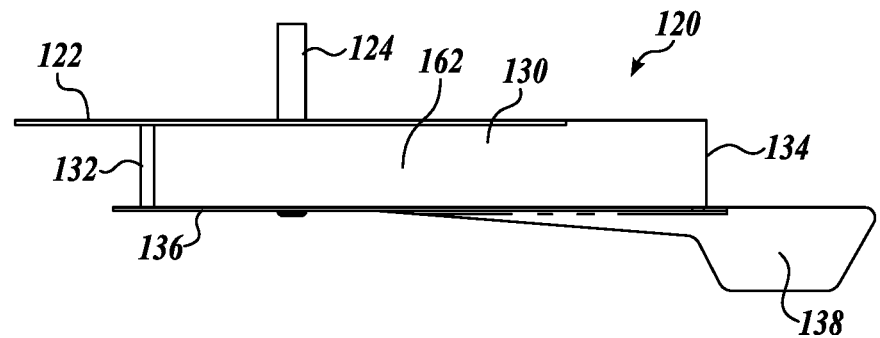
FIG. 4 is a top view of the drag reducing assembly of FIG. 3.

Generally described, the one or more drag reducing assemblies 120 are mounted on the side of the trailer in a spaced-apart manner, as best shown in FIG. 2. In some embodiments, the one or more drag reducing assemblies 120 are strategically placed along the side of the trailer in positions that experience off-axis airflow during forward motion of the combination. In this regard, the off-axis airflow occurs when a portion of the airflow along the trailer does not follow the longitudinal axis of the trailer. The one or more drag reducing assemblies 120 may be mounted to a surface of the vehicle or trailer via mounting posts 124, which are oriented perpendicular to the longitudinal axis of the trailer, as best shown in FIG. 4. In some embodiments, for stability, a mounting plate 122 is used. As will be described in more detail below, the drag reducing assemblies 120 may be configured to rotate about the mounting post 124 to provide self-alignment functionality to the drag reducing assemblies 120. In these embodiments, the mounting post 124 may include a bearing to facilitate rotation of the drag reducing assembly 120 about the mounting post 124.

Figure 3:
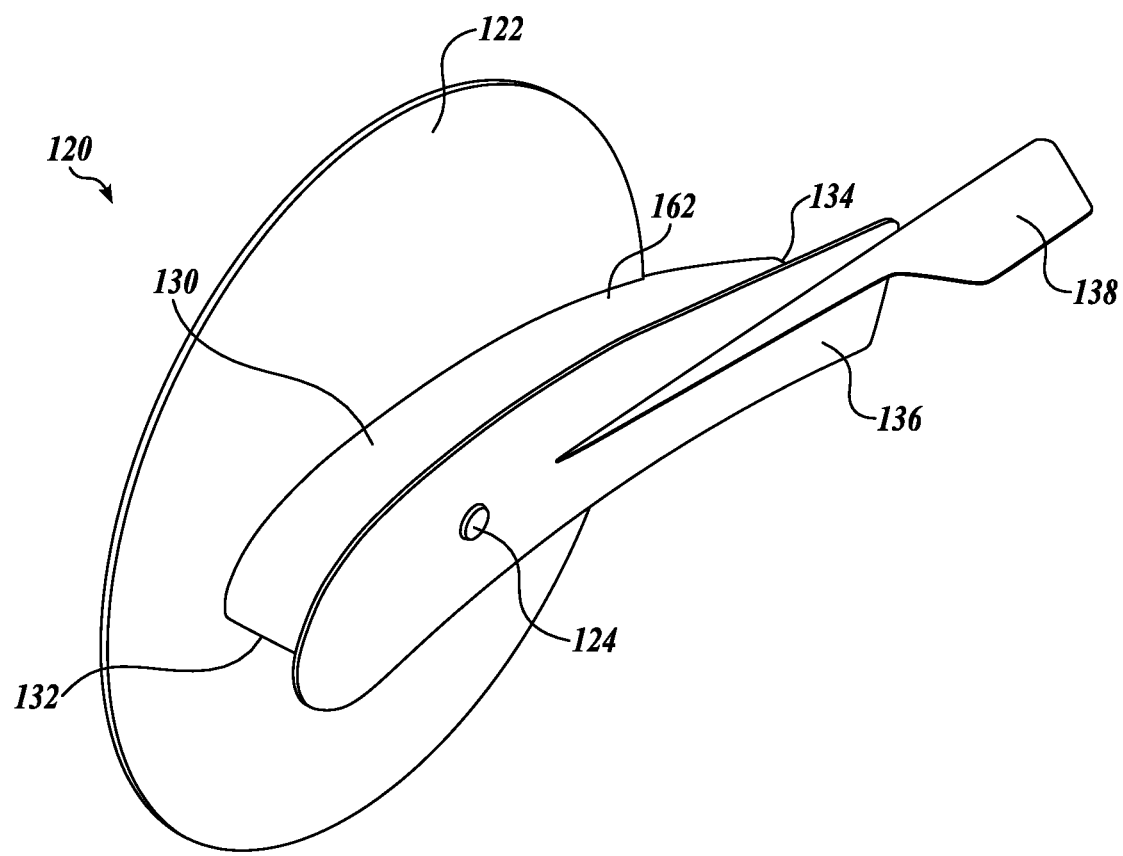
FIG. 3 is a front perspective view of a drag reducing assembly of FIG. 2.
Figure 5:
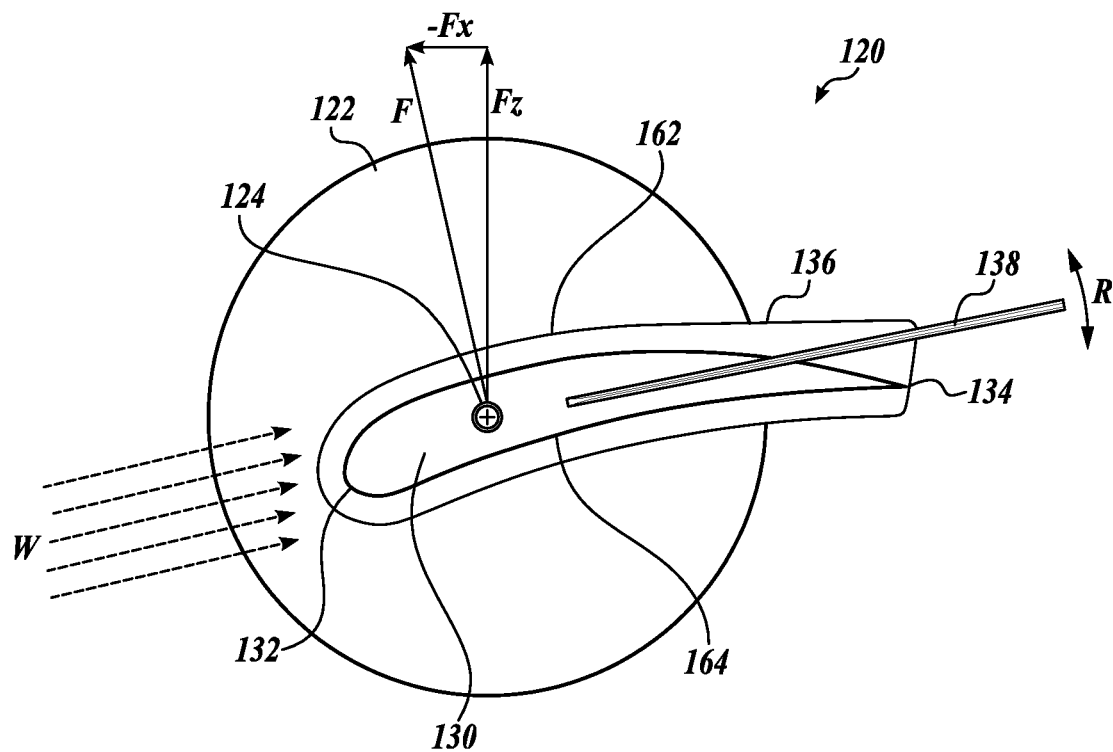
FIG. 5 is a right side view of the drag reducing assembly of FIG. 3.

Referring to FIG. 3, the one or more of the drag reducing assemblies 120, in some embodiments, include a forward thrust generator in the form of an asymmetrical airfoil 130. The airfoil 130 may have a variety of geometries, forming many different camber lines according to embodiments of the present disclosure. In the embodiment shown in FIGS. 3-5, each airfoil 130 includes an upper surface 162 and a lower surface 164 that converge fore and aft at leading and trailing edges 132 and 134, respectively. In the embodiment shown, the upper surface 162 is generally convex, while the lower surface 164 is generally concave, with the airfoil 130 having a chord line below the lower surface 164 thereof. When the airfoil 130 is positioned with respect to the trailer, the upper surface 162 faces generally upwardly of the trailer and the lower surface 164 faces generally downwardly. As such, during movement of the trailer, airflow (e.g., wind W) rearwardly from the leading edge 132 to the trailing edge 134 would progress at a higher velocity along the upper surface 162 as compared to the airflow along the lower surface 164, which in turn, generates a lift force F perpendicular to the relative wind W, as best shown in FIG. 5. The lift force F comprises a force vector (Fz) and a force vector (−Fx). It will be appreciated that the negative value of the Fx vector indicates that the Fx vector is in the opposite direction of drag, otherwise known as thrust. In conditions where the −Fx is greater than the additional drag caused by the presence of the drag reducing assembly 120, total net drag on the trailer is reduced.

The aforementioned properties of the airfoil 130 are directional, such that the rotational position of the airfoil 130 with respect to the wind W generates different lift and drag characteristics. In some embodiments, the drag reducing assemblies 120 also include a flow alignment vane 138. The flow alignment vane 138, in conjunction with the pivotal mounting provided by the mounting post 124, allow the airfoil 130 to self-align to a preferred angle of attack (AOA) with respect to the wind W created by the forward motion of the combination. In this regard, the flow alignment vane 138 is configured to provide a rotational force R to the components of the drag reducing assembly 120 that rotate about the mounting pin 124. In some embodiments, the drag reducing assembly 120 includes a directional biasing member (not shown), such as a torsional spring, configured to reorient the airfoil 130 to a neutral rotational position in the absence of wind over the upper and lower surfaces Turning now to FIGS. 6A-6C, in accordance with another aspect of the present disclosure, a self-deploying vortex diffuser plate assembly 140 for a tractor trailer combination or other vehicle. As shown, the vortex diffuser plate assembly 140 generally comprises a plurality of air vanes, or diffuser plates 142, rotatably coupled to the side panel 116 by hinged edges 150 (see FIG. 7). A representative diffuser plate 142 will now be described with the understanding that the described features can vary and that such variations should be considered within the scope of the present disclosure. In this regard, the variations can apply to all of the diffuser plates 142 of a particular diffuser plate assembly 140 or to just one or more of the individual diffuser plates of a diffuser plate assembly. That is, the described diffuser plate is exemplary only, and a diffuser plate assembly can comprise a plurality of identical diffuser plates or a combination of more than one diffuser plate configurations.

The diffuser plate 142 has a substantially quadrilateral profile, however, it will be appreciated that the shape one or more of the diffuser plates may vary from the illustrated embodiment to have any suitable shape. The diffuser plates 145 are preferably made from a lightweight, durable material such as sheet metal, fiberglass, polymers, composites, or any other suitable material or combination of materials.

Figure 7:
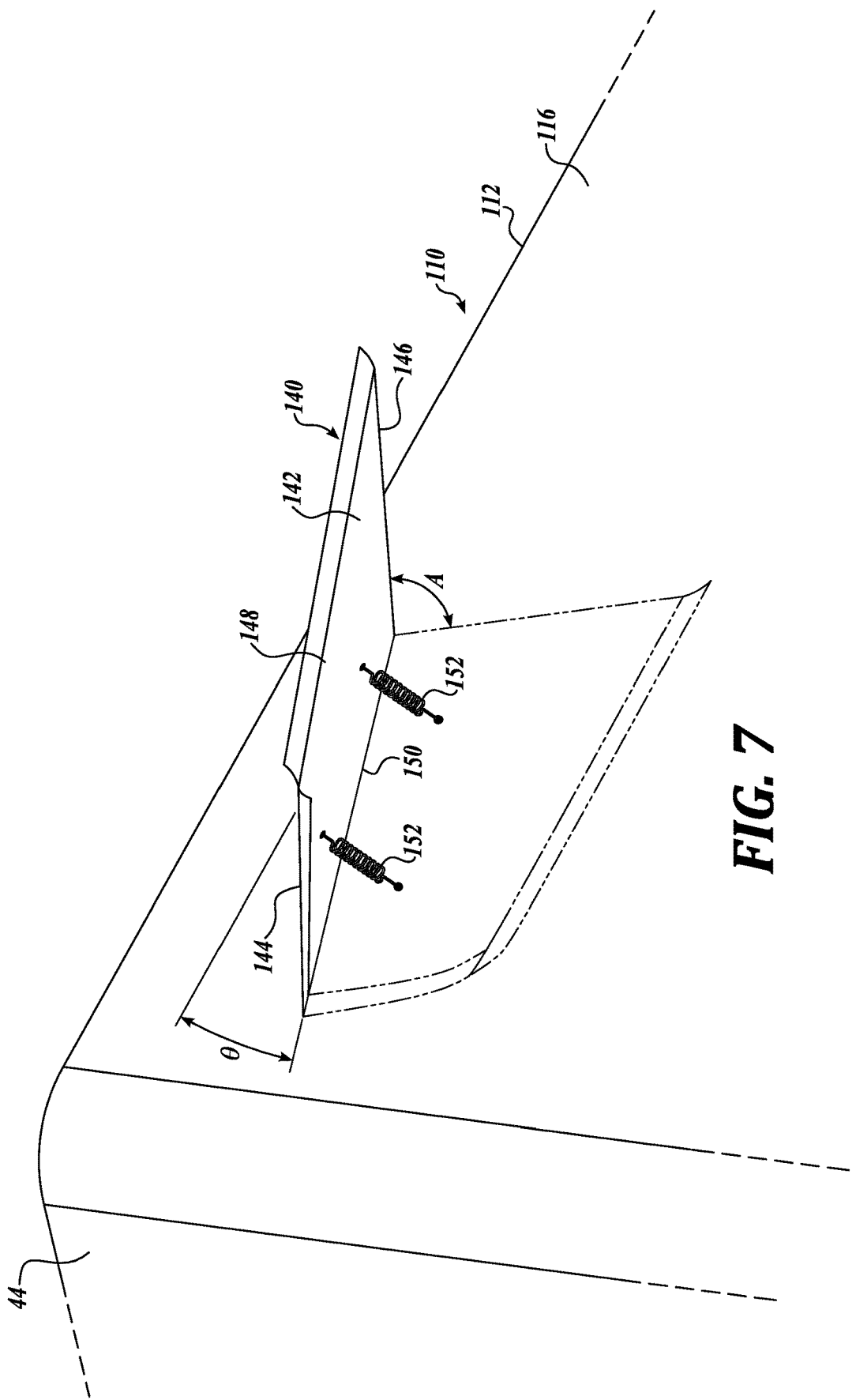
FIG. 7 is a front perspective view of the diffuser plate assembly of FIG. 6A, showing the diffuser plate assembly mounted to a side panel of a trailer.

An upper edge of each diffuser plate 142 is attached to the trailer 110 by a hinged edge 150 so that the diffuser plate 142 is rotatable between a first stowed position (shown in broken line in FIG. 7), in which the diffuser plate 142 extends downward from the hinged edge 150 along the side panel 116 of the trailer, and a second deployed position illustrated in FIG. 7, in which the diffuser plate 142 extends laterally from the side panel 116 of the trailer. As shown in FIG. 7, the hinged edge 150 is positioned such that the hinged edge 150 is angled downward at an angle θ towards the leading edge of the hinge. In the illustrated embodiment, the hinge line forms an angle of about 10° with a horizontal plane; however, the angle θ can vary for alternate embodiments of the diffuser plate assemblies 140 in general, as well as between individual diffuser plates 142 for a given assembly. In some embodiments, the angle θ is between about 1° and 20°. In other embodiments, the angle θ is any suitable angle.

Figure 6A:
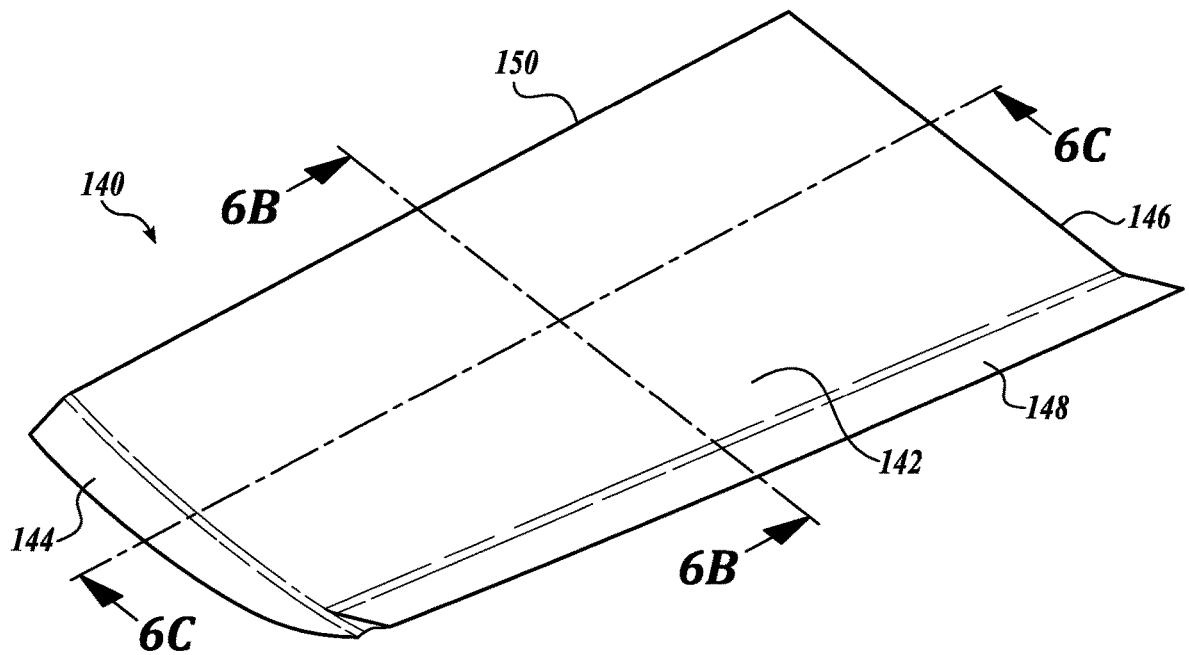
FIG. 6A is a front perspective view of another representative embodiment of a diffuser plate assembly formed in accordance with aspects of the present disclosure.
Figure 6B:
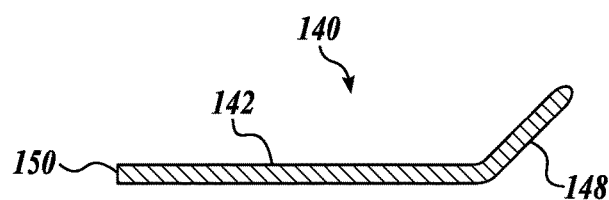
FIG. 6B is a cross-sectional view of the diffuser plate assembly of FIG. 6A taken along section 6B-6B.
Figure 6C:
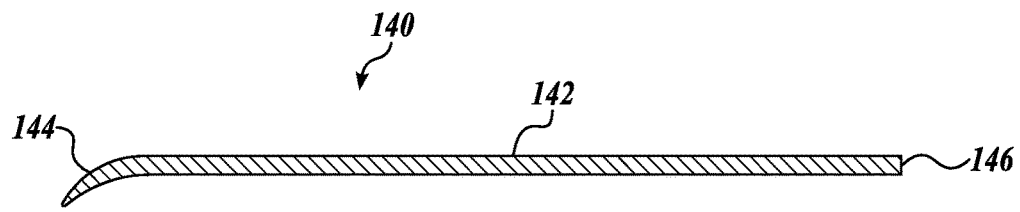
FIG. 6C is a cross-sectional view of the diffuser plate assembly of FIG. 6A taken along section 6C-6C.

As best shown in FIGS. 6A-6C, the diffuser plate 142 includes a leading edge 144 having an inward flare (see FIG. 6C). Under normal operating conditions where the airflow is generally longitudinal along the trailer, the streamwise (forward to rear) flow of air across the inward flare at the leading edge 144 will provide a biasing force that helps to maintain the diffuser plate 142 in the first stowed position. In some embodiments, the inward flare of the leading edge 144 is suitably between about 3° and about 10° from the diffuser plate 142. In other embodiments, the leading edge 144 is between about 20 mm and 50 mm in width.

The diffuser plate 142 further includes an outward flare along the outer edge 148 (see FIG. 6B). During a yaw (crosswind) condition, an upward airflow along the side of the trailer may occur. The upward airflow impacts the outward flare on the outer edge 148 to provide a force that tends to rotate the diffuser plate 142 upward along the hinged edge 150 from the first stowed position to the second deployed position. In some embodiments, the outer edge 148 is configured such that airflow greater than a predetermined threshold is required to rotate the diffuser plate 142 upward to the second deployed position. In some embodiments, the outward flare of the outer edge 148 is suitably between about 5° and about 20° from the diffuser plate 142, and the outer edge 148 is between about 20 mm and 50 mm in width. In some embodiments, the trailing edge 146 of the diffuser plate 140 includes a gurney strip (not shown), which is a small tab typically extending at a right angle to the pressure side surface of an airfoil to increase aerodynamic performance.

In other embodiments, the diffuser plate 142 rotates from the first stowed position to the second deployed position by the use of a mechanical device. In this regard, the deployment of the diffuser plate 142 may suitably be a linkage, hydraulic, pneumatic, or a combination thereof. In these mechanical deployment embodiments, the flares at the leading edge 144 and the trailing edge 148 may be omitted such that the diffuser plate 142 is flat against the surface in the first stowed position.

As shown in FIG. 7, a travel limiter 152 extends from the side panel 116 to the diffuser plate 142. The travel limiter 152 acts as a rotational stop to hold the diffuser plate 142 at a predetermined angle A when in the second deployed position under yaw conditions. In some embodiments, the predetermined angle A is between about 60° and about 90°. In the illustrated embodiment, the travel limiter 152 is formed from an elastic material, such as a rubber or a bungee configuration, such that the travel limiter 152 also acts as a shock absorber. It will be appreciated that any number of suitable travel limiter configurations can be utilized to control the deployed position of the diffuser plate 142, including tension springs, torsion springs, bump stops, hinges with integral stops, or any suitable design.

During normal operation of the tractor trailer, i.e., no yaw condition, the diffuser plates 142 are in the first stowed position. When so positioned, the diffuser plates 142 extend downward from their respective hinged edges 150 and are positioned flat against the side panel 116 of the trailer and incur minimal drag. Gravity, and in some embodiments, biasing members or aerodynamic features, maintain the diffuser plates 142 in the stowed position until a yaw condition greater than a particular threshold occurs. When a yaw condition occurs, the upward stream of air contacts the outer edges 148 and lifts the diffuser plates 142 to rotate about the hinged edges 150, until further rotation is stopped by the rotational stops 152. When in this second deployed position, the diffuser plates 142 act to decrease drag and, therefore, increase aerodynamic efficiency in a number of ways.

Figure 8A:
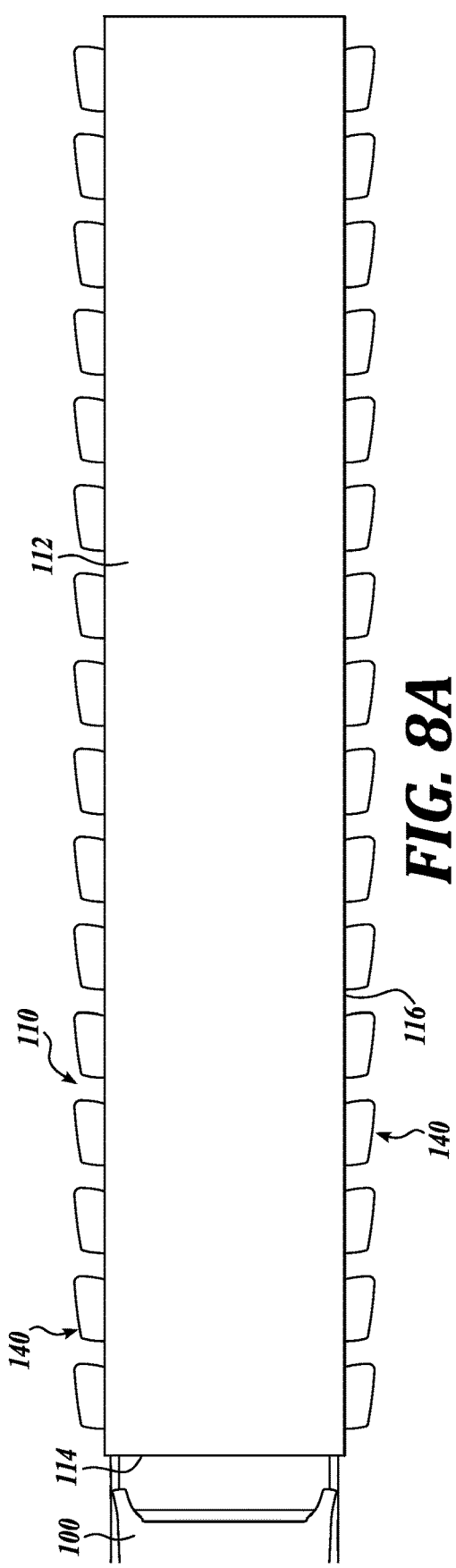
FIG. 8A is a top view of an aerodynamic system showing a plurality of the diffuser plate assemblies of FIG. 6A.
Figure 8B:
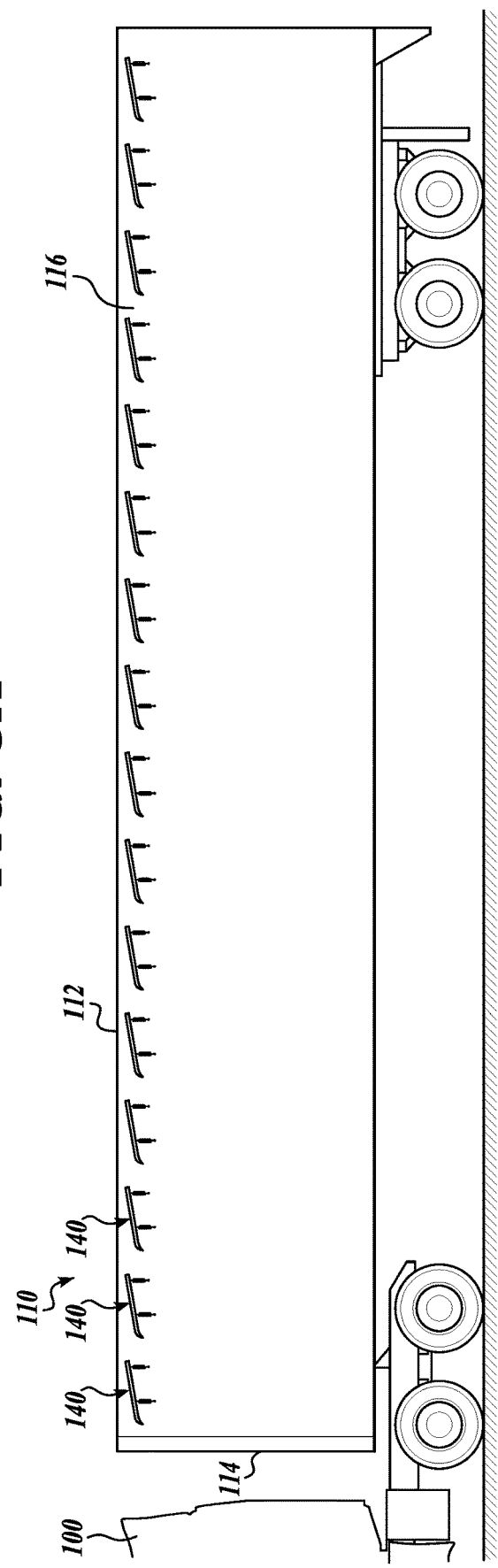
FIG. 8B is a right side view of the aerodynamic system of FIG. 8A.
Figure 9A:
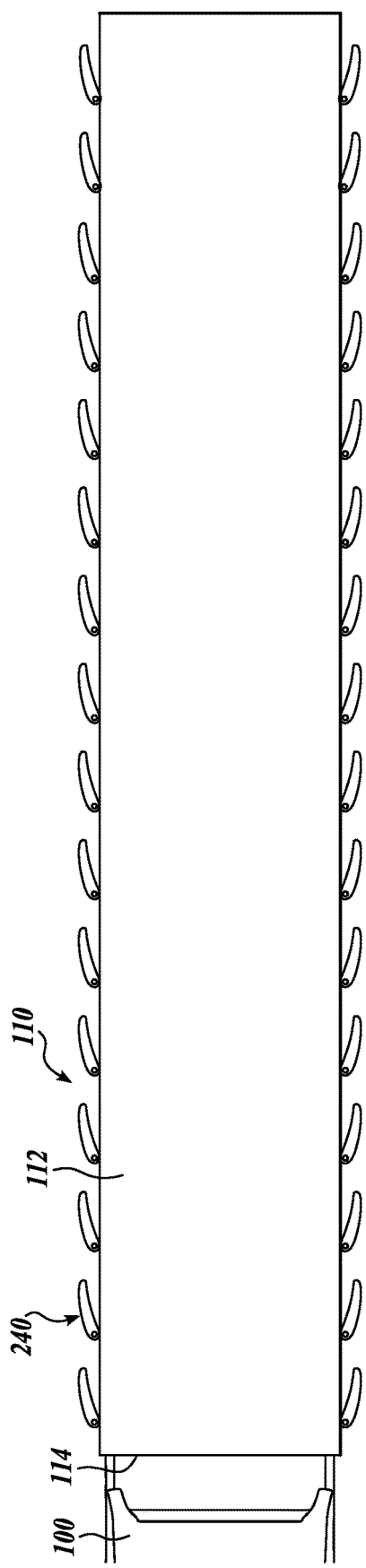
FIG. 9A is a top view of another representative embodiment of an aerodynamic system formed in accordance with aspects of the present disclosure, showing a plurality of aerodynamic components.
Figure 9B:
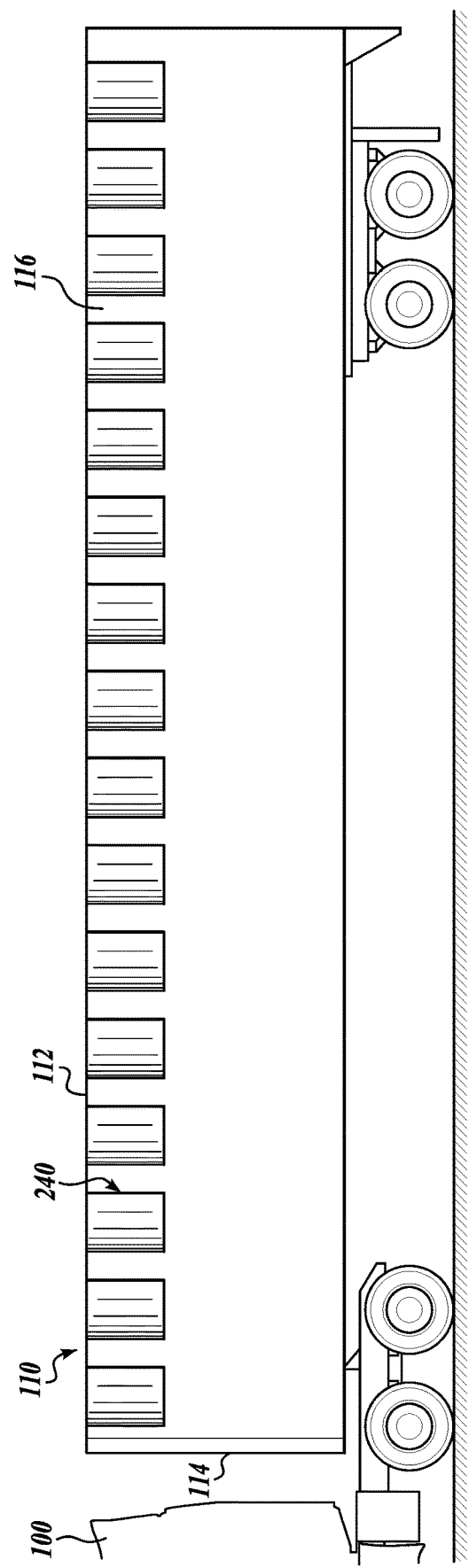
FIG. 9B is a right side view of the aerodynamic system of FIG. 9A.

Turning now to FIGS. 8A and 8B, an aerodynamic assembly 110 is shown. In the illustrated embodiment, when the trailer experiences a yaw condition, air flows in an upward and rearward direction along the side panel 116 of the trailer. In a baseline configuration (no diffuser plates), this airflow detaches from the top surface 112 of the trailer and forms a conical vortex. With the diffuser plate assembly 130 installed as shown in FIGS. 8A and 8B, the upward airflow created by the yaw condition deploys the diffuser plates 142. When deployed to the second position, as shown, the diffuser plates 142 act like sails so that the force of the airflow impinging the lower surface of the diffuser plates 142 creates a resultant force normal to the hinged edge 150 of the diffuser plate 142. Although the aerodynamic assembly 110 is shown in FIG. 8A with the diffuser plate assemblies 140 in the second deployed position on both sides of the trailer, it should be appreciated that in typical airflow conditions, only a single side may have the diffuser plate assemblies 140 in the second deployed position at a given time. Because the hinged edge 150 is angled downward toward the leading edge 144 of the diffuser plate 142, the force normal to the hinged edge 150 acts in a forward direction. In this regard, the diffuser plates 142 act in a cumulative manner to provide a total thrust force on the trailer in the forward direction. That is, the diffuser plates 142 convert some of the energy of the crosswinds into a useful force that helps propel the tractor trailer forward.

In another aspect, the diffuser plates 142 are also configured to improve aerodynamic efficiency by diffusing the conical vortex that forms along the top of the trailer in the baseline configuration. The conical vortex consumes vehicle energy and increases drag. When the diffuser plates 142 are in the second deployed position, the upward airflow along the sides of the trailer us broken into sections, which inhibits vortex formation and decreases drag. Vortex inhibition also contributes to higher trailer aft face pressure, which also serves to lower overall vehicle drag as compared to the baseline configuration.

In the illustrated embodiment of FIGS. 8A and 8B, the aerodynamic assembly 110 comprises a plurality of diffuser plates 142 positioned in a line along the top edge of each side panel 116 of the trailer. It will be appreciated that the number and position of diffuser plates 142 can vary within the scope of the present disclosure. In one alternate embodiment, not shown in the FIGURES, a second row of diffuser plates suitably extends horizontally along a middle portion of the side panel 116 of the trailer. Additional rows of diffuser plates may also be positioned along the top surface of the trailer. These and other alternate configurations are contemplated and should be considered within the scope of the present disclosure.

Turning to FIGS. 9A, 9B, 10A, and 10B, in accordance with another aspect of the present disclosure, one or more aerodynamic components 240 and 340 can be alternatively or additionally provided on the trailer along the upper section of the side panel 116 (FIGS. 9A and 9B), or the top surface 112 thereof (FIGS. 10A and 10B). The one or more aerodynamic components 240 and 340 are spaced apart as the aerodynamic components 240 and 340 extend rearwardly. In the embodiments shown, the components are in the form of airfoil panels 240 and 340, each having a lower or pressure surface and an upper or suction surface that converge fore and aft at leading and trailing edges, respectively. In the embodiments shown, the upper surfaces are generally convex, the lower surfaces are generally concave, and the airfoils 240 and 340 have a chord line below the lower surface thereof. In some embodiments, the airfoils 240 and 340 are oriented in order to have a positive or neutral angle of attack in off axis airflow. It will be appreciated that with suitable angles of attack, the airfoils will produce a −Fx drag vector, otherwise known as a forward thrust vector, during forward motion of the tractor-trailer combination.

In some embodiments, the airfoils are permanently deployed and extend upwardly from the roof, as shown in FIGS. 10A and 10B. In other embodiments, the airfoils may be selectively movable between a stowed position and a deployed position, such that the airfoils extend upwardly from the top surface 112 of the trailer. The airfoils can be deployed together or separately. In some embodiments, the airfoils can be deployed via a four bar linkage arrangement or linear sliders (not shown).

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A drag reducing system for a bluff body having a length and a height, the system comprising:
    an air vane hingedly couplable to a surface of the bluff body, the air vane having a body portion, a leading portion, a lateral portion, an upper surface, and a lower surface, the air vane configured to rotate from a first position, wherein the air vane is positioned adjacent to the surface, to a second position, wherein the air vane is positioned projecting at an angle away from the surface,
    wherein the leading portion is flared inward toward the surface in the first position to provide a force to bias the air vane toward the first position when the airflow along the surface is aligned with the length of the bluff body, wherein the lateral portion is flared away from the surface in the first position to provide a force to rotate the air vane from the first position toward the second position when the airflow along the surface has a directional component upward along the height of the bluff body.

2. The drag reducing system of claim 1, wherein the air vane is aligned at an angle from a direction along the length of the bluff body.

3. The drag reducing system of claim 2, wherein the angle positions the leading portion downward between about 1° and 20°.

4. The drag reducing system of claim 1, further comprising a biasing member couplable between the air vane and the surface, wherein the biasing member is configured to stop the rotation of the air vane at the second position, and wherein the biasing member is configured to bias the air vane toward the first position.

5. The drag reducing system of claim 4, wherein the biasing member stops the rotation of the air vane at an angle between about 60° and 90° from the surface of the bluff body.

6. The drag reducing system of claim 1, wherein the air vane further includes a gurney strip at a trailing edge of the air vane.

7. The drag reducing system of claim 1, wherein the flare of the leading portion is positioned at an angle between about 3° and 10° from the body portion.

8. The drag reducing system of claim 1, wherein the flare of the lateral portion is positioned at an angle between about 5° and 20° from the body portion.

* * * * *